United States Patent [19]

Wachi

[11] 4,231,277

[45] Nov. 4, 1980

[54] PROCESS FOR FORMING MUSICAL TONES

[75] Inventor: Masatada Wachi, Hamamatsu, Japan

[73] Assignee: Nippon Gakki Seizo Kabushiki Kaisha, Hamamatsu, Japan

[21] Appl. No.: 955,882

[22] Filed: Oct. 30, 1978

[51] Int. Cl.$^3$ .......................... G10H 1/02; G06F 7/38

[52] U.S. Cl. ...................................... 84/1.19; 84/1.01; 364/724

[58] Field of Search ...................... 84/1.01, 1.03, 1.11, 84/1.12, 1.24, 1.19; 364/718, 721, 724, 725, 726

[56] References Cited

U.S. PATENT DOCUMENTS

| | | | |
|---|---|---|---|
| 3,778,606 | 12/1973 | Schmitt | 364/726 |
| 3,809,786 | 7/1974 | Deutsch | 84/1.01 |
| 3,816,729 | 6/1974 | Works | 364/726 |
| 3,884,108 | 5/1975 | Deutsch | 84/1.24 |
| 3,956,960 | 5/1976 | Deutsch | 84/1.11 |
| 4,023,028 | 5/1977 | Dillard | 364/726 |
| 4,062,060 | 12/1977 | Nussbaumer | 364/725 |
| 4,093,994 | 6/1978 | Nussbaumer | 364/725 |
| 4,106,103 | 8/1978 | Perreault | 364/726 |
| 4,116,103 | 9/1978 | Deutsch | 364/718 |

*Primary Examiner*—J. V. Truhe
*Assistant Examiner*—Forester W. Isen
*Attorney, Agent, or Firm*—Spensley, Horn, Jubas & Lubitz

[57] ABSTRACT

Data-processings for spectrum signals which express the frequency spectrum distributions of corresponding tone waveshape signals, are performed on a frequency domain. The processed spectrum signals are transformed to the corresponding tone waveshape signals by the Fast Inverse Fourier Transform algorithm. Thus filters of desired characteristics on a frequency domain can be composed of simple and inexpensive circuits, and musical tones having desirable tone qualities with abundant varieties can be easily generated.

17 Claims, 7 Drawing Figures

PROCESS FOR FORMING MUSICAL TONES

BACKGROUND OF THE INVENTION

The present invention relates to a process for forming musical tones in an electronic musical instrument.

Digital waveshape syntheses and digital waveshape processings for forming musical tones are disclosed, for example, in a U.S. Pat. No: 3,809,786 entitled COMPUTOR ORGAN by Ralph Deutch et al., and a U.S. Pat. No: 3,878,749 entitled WALSH FUNCTION TONE GENERATOR AND SYSTEM by Robert P. Woron.

In all these heretofore known waveshape syntheses and processings, all the data-processings are performed on a time domain, where a waveshape is expressed as a function of time. Data-processings on a time domain are sometimes confronted with difficulties in hardware designs. For example, when a digital filter is required for a data-processing in a time domain, it often becomes difficult to build a digital filter of the requirement. As will be easily understood, a filter used in a data-processing to form a desired tone waveshape must have a high degree characteristic, for example, a sharp cutoff characteristic. A digital filter is composed of delay elements, attenuator elements, and adder elements; and numbers of these elements are required to compose a digital filter of a high degree characteristic; and therefore, the filter will become bulky and expensive.

SUMMARY OF THE INVENTION

Therefore, a general object of the present invention is to eliminate the difficulties confronted by heretofore known waveshape processing on a time domain. This objective is achieved by data-processings on a frequency domain.

A function y(t) which represents a tone wave-shape as a function of time t will here be called a signal on a time domain. The signal y(t) on a time domain can be expressed in a form of a Fourier series as composed of a series of components having different frequencies. This Fourier series may also be expressed as a frequency distribution function Y(f) in which the amplitude of each frequency component is expressed as a function of the corresponding frequency f. Thus, the frequency distribution function Y(f) will here be called a signal on a frequency domain. When a transfer function on a frequency domain is denoted by H(f), a digital filter on a frequency domain can be composed of a multiplier which multiplies each frequency component of the signal Y(f) by the corresponding frequency component of H(f). Consequently, a digital filter on a frequency domain is far simpler than an equivalent digital filter on a time domain. After all the important data-processings are completed on a frequency domain, the signal on a frequency domain is transformed to the corresponding signal on a time domain by an Inverse Fourier Transform algorithm.

As the signal Y(f) on a frequency domain changes with time t, the Inverse Fourier Transform are repeated for each predetermined time interval $T_o$, forming a part of a tone waveshape in the interval with the corresponding data of Y(f) for the interval. This time interval $T_o$ is usually determined to be the period of the lowest frequency component contained in the signal Y(f). When the signal Y(f) does not change for two successive Inverse Fourier Transform cycles, the composed waveshape in the earlier transform cycle will exactly coincide with the composed waveshape in the following transform cycle.

Generally, the signal Y(f) changes for two successive transform cycles, and a waveform composed in a transform cycle is different from the waveform composed in the following transform cycle. Thus, the composed waveshape on a time domain has a discontinuity at each time point between two successive Inverse Fourier Transform cycles. As is easily understood, this discontinuity in the composed waveshape will be a cause of a noise.

Another important object of the present invention is to provide a method for eliminating this discontinuity generated in the Inverse Fourier Transform operation.

Other objects and aspects of the invention will become apparent from the following description of the embodiments with reference to accompanying drawings.

DESCRIPTION OF THE PREFERRED EMBODIMENT

Figure 1:
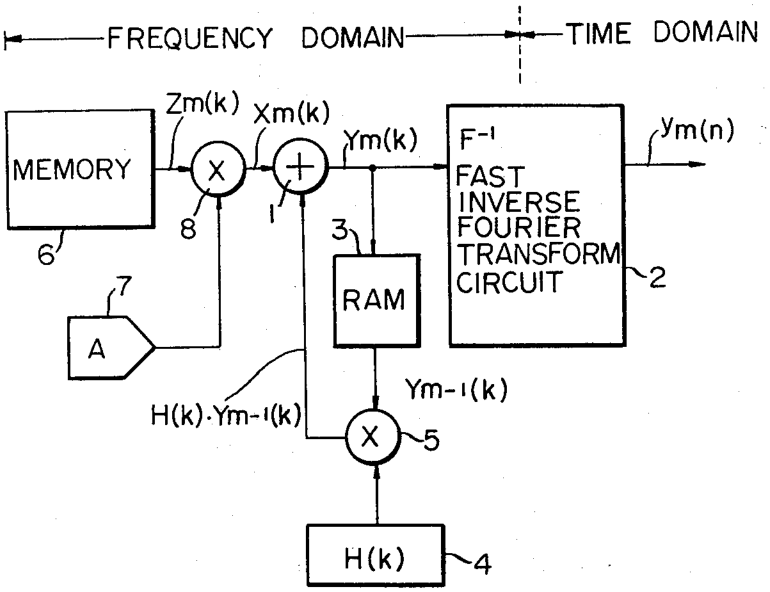
FIG. 1 is a schematic block diagram of an embodiment of the present invention.

Referring now to the drawings in detail wherein like numerals indicate like elements, there is shown in FIG. 1 a schematic block diagram of an embodiment of the present invention. In FIG. 1, 1 is an adder, 2 is a Fast Inverse Fourier Transform circuit, 3 is a RAM (random access memory), 4 is a register, 5 is a multiplier, 6 is a memory, 7 is a register storing a coefficient A, and 8 is a multiplier.

And in FIG. 1, all the signals in the left of the Fast Inverse Fourier Transform circuit 2 are signals on a frequency domain, and a signal in the right of the Fast Inverse Fourier Transform circuit 2 is a signal on a time domain.

Figure 2:
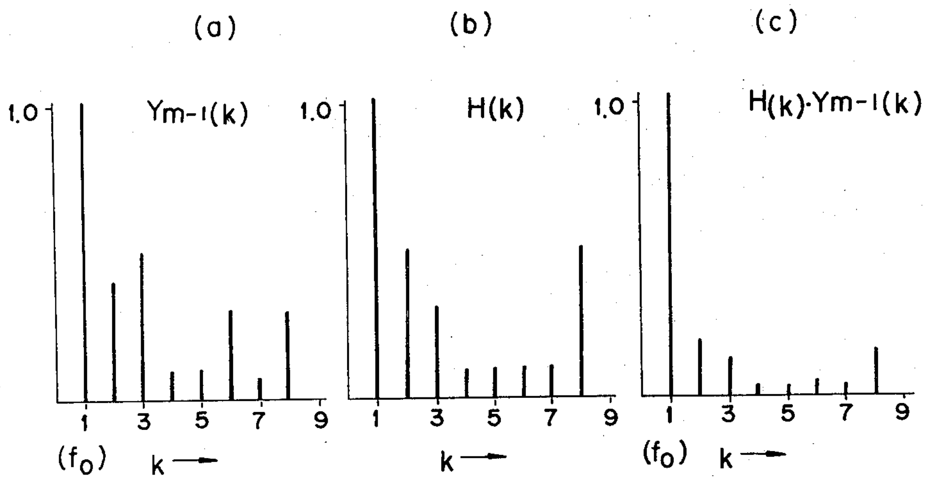
FIG. 2 illustrates examples of signals on a frequency domain in accordance with the present invention.

As is well known, a frequency spectrum of a tone waveshape can be approximated by a line spectrum in which the spectrum is concentrated only at frequencies of the fundamental frequency of the tone waveshape and its harmonic frequencies. This is illustrated by FIG. 2, where examples of signals on a frequency domain in accordance with the present invention are shown. In FIG. 2, k in the abscissa represents the harmonic order and the ordinate represents the intensity of the spectrum, k=1 corresponding to the fundamental frequency $f_o$. For example, FIG. 2(*a*) shows the frequency distribution function of a tone waveshape which has frequency components of $f_o$, $2f_o$, $3f_o$, $4f_o$, $5f_o$, $6f_o$, $7f_o$, and $8f_o$.

Since the frequency distribution function Y(f) of a tone waveshape has components only at frequencies $kf_o$, where k is an integer, the function Y(f) can be represented by a function of $kf_o$. Further, the information of the fundamental frequency $f_o$ is introduced by timing clock circuits (not shown in FIG. 1) as will be explained in a later paragraph, and all the frequency distribution functions will be represented as a function of k, and be denoted, for example, by Y(k).

When the frequency distribution function of a tone waveshape is expressed by a function of k, a transfer function H(f) on a frequency domain is also expressed by a function of k, and is denoted by H(k). As described in the foregoing paragraph, the Inverse Fourier Transform operation are repeated for each predetermined time duration $T_o$, and the signals on a frequency domain are renewed at each time interval $T_o$. Therefore, as shown in FIG. 1, the signals on a frequency domain are expressed by $X_m(k)$, $Y_m(k)$, $Z_m(k)$, $Y_{m-1}(k)$, where the suffix m means that the signal is the signal at the m-th transform cycle. Thus, the signal $Y_{m-1}(k)$ means a frequency spectrum preceding the frequency spectrum denoted by the signal $Y_m(k)$.

The function on a time domain in FIG. 1 is denoted by $y_m(n)$, where the suffix m means that the signal is the signal at the m-th transform cycle, and the variable n means the order of the sampling point in the time interval $T_o$.

And for the sake of distribution in this specification, the signal $X_m(k)$ is called a first spectrum signal, the signal $H(k)\cdot Y_{m-1}(k)$ is called a second spectrum signal, the signal $Y_m(k)$ is called a third spectrum signal.

At the adder 1, the first spectrum signal $X_m(k)$ is added to the second spectrum (hereinafter explained) signal to produce the third spectrum signal $Y_m(k)$. The RAM 3 is to delay the signal $Y_m(k)$ by the time interval $T_o$, and therefore, the output of the RAM 3 will be denoted by the signal $Y_{m-1}(k)$, which means the signal in one cycle earlier transform cycle when the present input to the RAM 3 is the signal $Y_m(k)$. The register 4 stores a first transfer function H(k), and the signal $Y_{m-1}(k)$ is multiplied at the multiplier 5 to produce the second spectrum signal $H(k)\cdot Y_{m-1}(k)$.

Again referring to FIG. 2, FIG. 2(*a*) shows the signal $Y_{m-1}(k)$, FIG. 2(*b*) shows the first transfer function H(k), and FIG. 2(*c*) shows the signal $H(k)\cdot Y_{m-1}(k)$. In this multiplication of $H(k)\cdot Y_{m-1}(k)$, the component for k=1 in $Y_{m-1}(k)$ is multiplied by the component for k=1 in H(k) to produce the component for k=1 in $H(k)\cdot Y_{m-1}(k)$, the component for k=2 in $Y_{m-1}(k)$ is multiplied by the component for k=2 in H(k) to produce the component for k=2 in $H(k)\cdot Y_{m-1}(k)$, and thus, each frequency component of the signal is multiplied by the corresponding component of the transfer function and the result will become as shown by FIGS. 2(*c*). Therefore, the data-processings by the adder 1, the RAM 3, and the multiplier 5 can be expressed by an equation, $$Y_m(k)=X_m(k)+H(k)\cdot Y_{m-1}(k) \quad (1).$$

The third spectrum signal $Y_m(k)$ is transformed in the Fast Inverse Fourier Transform circuit 2 to the corresponding signal $y_m(n)$ on a time domain. This signal $y_m(n)$ will be here called a fourth waveshape signal. When the operation of the Inverse Fourier Transform is denoted by $$F^{-1},\ y_m(n)=F^{-1}(Y_m(k)) \quad (2).$$

The memory 6 stores a frequency distribution function table, and the signal $Z_m(k)$ is read out from the memory 6 and is multiplied by a coefficient A stored in the register 7 to produce the signal $X_m(k)$ in accordance with the equation, $$X_m(k)=A\cdot Z_m(k) \quad (3).$$

All these operations denoted by the equations (1), (2), (3) are performed by respective timing clocks (the circuits for these timing clocks are not shown in the drawing), and the frequencies of these timing clocks are determined in such a way as to complete each cycle of these operations in the time interval $T_o$ which is usually equal to the period of the fundamental frequency $f_o$ of the composed tone waveshape. Thus, a timing clock having a frequency equal to a predetermined multiple of the fundamental frequency $f_o$ controls the operation timing of the Fast Inverse Transform circuit 2, and for each transform cycle, the signal $Y_m(n)$ is composed for a time duration of $T_o$, followed by the next signal $y_{m+1}(n)$ composed in the next transfrom cycle. It is apparent that the composed waveshape represented by the signal $y_m(n)$ has the fundamental frequency $f_o$ and the harmonic contents determined by the signal $Y_m(k)$.

As in heretofore known electronic musical instruments, the key-code is detected from the operated key, and this key-code determines the timing clock frequency. In one embodiment of the present invention, the timing clock frequency is changed in proportion to the tone fundamental frequency $f_o$ throughout the entire frequency range of the tone fundamental frequency $f_o$, and therefore, the timing clock frequency increases as the tone fundamental frequency $f_o$ increases. In a preferred embodiment of this invention, in order to avoid an excessive rise of the timing clock frequency, the number of words included in the signals $X_m(k)$, $Y_m(k)$ is reduced by half when the tone fundamental frequency $f_o$ is increased by an octave. Thus, the data processing time interval per word is maintained constant.

In the frequency distribution functions corresponding to tone waveshapes, a highest frequency limit $f_{max}$ can be introduced, the frequencies higher than the limit frequency $f_{max}$ coming in an inaudible range. Therefore this limit frequency $f_{max}$ can be determined as a constant irrespective of the tone fundamental frequency $f_o$.

When the highest frequency limit $f_{max}$ is introduced in the frequency distribution functions, the number of words included in the signals $X_m(k)$, $Y_m(k)$ will naturally decrease as the fundamental frequency $f_o$ is increased. For example, when $f_{max}$ is set at a frequency of 17.6 kHz, and $f_o$=220 Hz, $f_{max}/f_o$=80, and signals $X_m(k)$, $Y_m(k)$, $Y_{m-1}(k)$ have intensities at k=1, 2, 3, . . . 80. When one word is assigned to represent an amplitude at each value of k, each signal $X_m(k)$, $Y_m(k)$, $Y_{m-1}(k)$ is composed of 80 words. Data-processings for these 80 words must be completed in a time duration of $T_o$=1/220 second. When the tone fundamental frequency becomes 3 octaves higher and $f_o$=1,760 Hz, $f_{max}/f_o$=10, each signal $X_m(k)$, $Y_m(k)$, $Y_{m-1}(k)$ being composed of 10 words. Data-processings for these 10 words must be completed in a time duration of $T_o$=1/1,760 second. Therefore, the time duration assigned for data-processings per word is the same 1/17,600 second for $f_o$=220 Hz and for $f_o$=1,760 Hz.

For the signal $y_m(n)$ on a time domain, the sampling frequency $f_s$ may have the highest frequency limit. As the signal $y_m(n)$ is composed from the signal $y_m(k)$, the highest frequency component in the signal $y_m(n)$ is limited by the limit frequency $f_{max}$. Since the sampling frequency $f_s$ is determined in relation with the highest frequency component (in one example, $f_s$ is determined to be equal to twice the frequency of the highest frequency component), the total number N of the sampling points in one cycle of the signal $y_m(n)$ will be reduced by half when the fundamental frequency is increased by an octave. Thus, the number of words included in the signal $y_m(n)$ is reduced by half as the fundamental frequency $f_o$ is increased by an octave, and the data-processing time interval per word of the signal $y_m(n)$ will be maintained constant.

Since the timing clock frequency is determined by the data-processing time interval per word, the frequency of the timing clock remains constant when the fundamental frequency $f_o$ changes by an octave step. In order to generate the twelve (12) different note frequencies in a same octave, the 12 different clock frequencies must be provided.

Therefore, in an embodiment of this invention where number of words included in the signals $X_m(k)$, $Y_m(k)$ is reduced by half when the tone fundamental frequency $f_o$ is increased by an octave, the key-code which determines the fundamental frequency $f_o$ is composed of an octave code and a note code. The octave code indicates the octave in which the fundamental frequency $f_o$ belongs, and determines the number of words included in the signals $X_m(k)$, $Y_m(k)$, and the note code specifies the note of the fundamental frequency $f_o$, and determines the frequency of the timing clocks.

For example, when the octave code specifies 160 words and the note code specifies 20,930 Hz clock frequency per word, the generated tone frequency will be 20,930 Hz/160=130.8 Hz; when the octave code specifies 20 words at the same note code specifying 20,930 Hz clock, the generated tone frequency will be 20,930 Hz/20=1,046 Hz; when the octave code specifies 160 words and the note code specifies 35,200 Hz clock frequency per word, the generated tone frequency will be 35,200 Hz/160=220 Hz; and when the octave code specifies 20 words at the same note code specifying 35,200 Hz clock, the generated tone frequency will be 35,200 Hz/20=1,760 Hz.

In another embodiment of this invention, a FIFO (first-in-first-out) type memory is used, and all the timing clock frequencies in the system shown in FIG. 1 are maintained constant, generating the signal $y_m(n)$ at a constant rate per word, and temporarily storing the signal $y_m(n)$ in a FIFO type memory (not shown in FIG. 1). The FIFO type memory will be described in later paragraphs in connection with FIG. 4.

In FIG. 2, there are illustrated the spectrum intensity only, not including any information of the phasing of the harmonics. because it is considered that changes in the relative phasing of the harmonics in a tone waveshape do not create substantial change in the perception of the musical tone by a human ear.

In a general case, however, the signals $Y_m(k)$ and $H_m(k)$ are composed of intensity signals $|y_m(k)|$, and $|H_m(k)|$ and the respective phase signals $ARG(Y_m(k))$ and $ARG(H_m(k))$, and, as will be described in later paragraphs, these phase signals are included in data-processings on a frequency domain.

Figure 3:
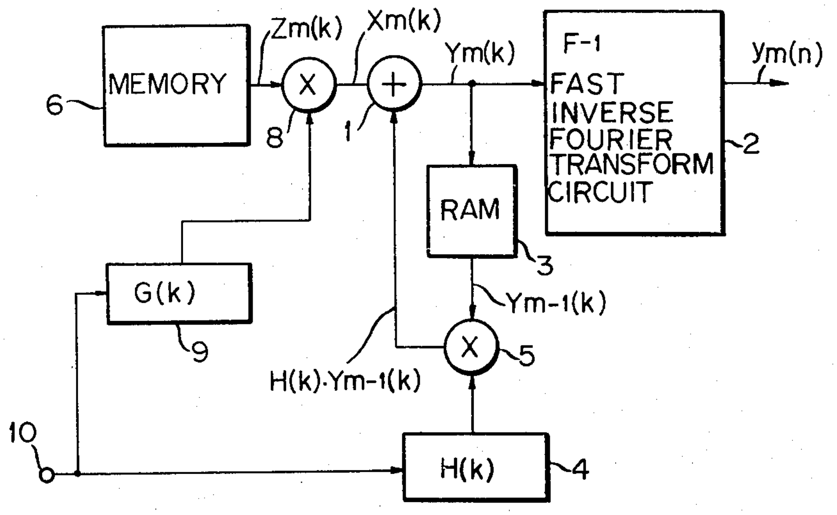
FIG. 3 is a schematic block diagram of another embodiment of the present invention.

Referring now to FIG. 3, where a schematic block diagram of another embodiment of the present invention is illustrated. In FIG. 3, like numerals indicate like elements in FIG. 1, and 9 represents another register storing a second transfer function G(k) on a frequency domain, while 10 is an input terminal of a touch control signal. In the embodiment shown by FIG. 3, both transfer functions are modified by the touch control signal, and the data-processings in the system shown by FIG. 3 are performed in accordance with equations (1) and (2) as described in connection with FIG. 1, and with the third equation, $$X_m(k)=G(k)\cdot Z_m(k) \tag{3'}$$

The touch control signal is a signal indicating the state of the touch when a player of a musical instrument presses a key on a keyboard; for example, a touch control signal is a signal indicating the force on the key as a function of time. Therefore, the touch control signal may be detected by a pressure-to-electric transducer or by a velocity-to-electric transducer which may be attached to each key. It is well known that a tone quality of a natural musical instrument changes in accordance with the state of the touch, and in an embodiment of this invention, the generated tone quality is changed in accordance with the state of the touch by modifying both transfer functions H(k) and G(k) with the touch control signal.

It is also apparent that these transfer functions H(k) and G(k) can be modified by signals other than the touch control signal, or these transfer functions can be changed with time in accordance with a predetermined program.

Figure 4:
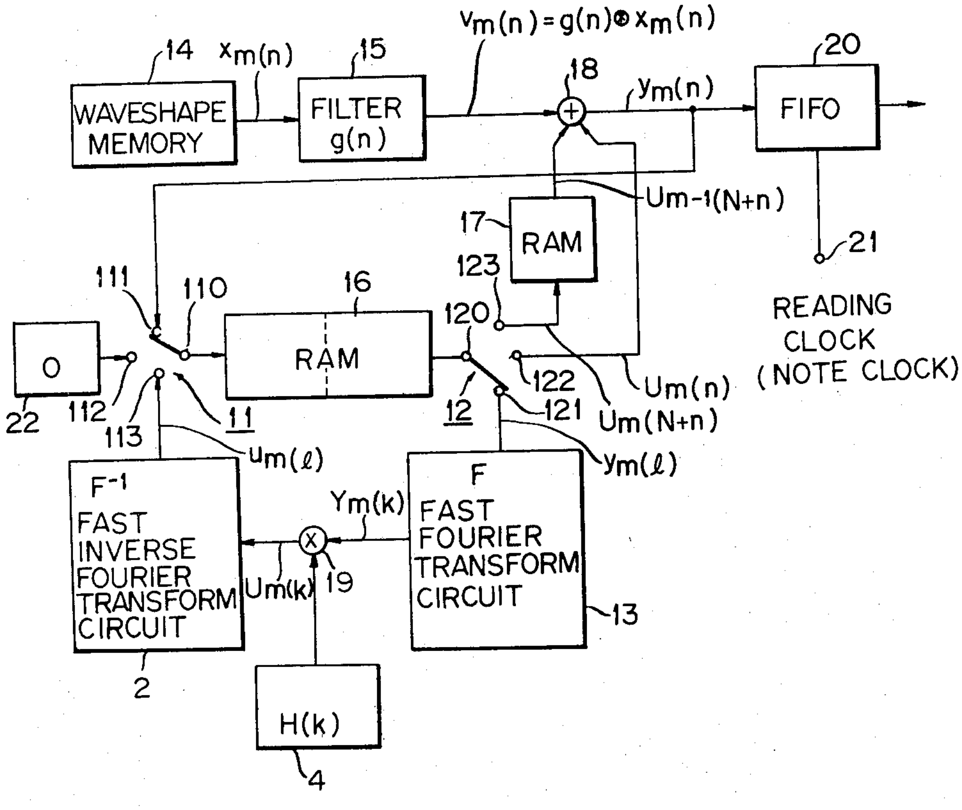
FIG. 4 is a schematic block diagram of still another embodiment of the present invention.

Now coming to FIG. 4, these is shown a method for eliminating the discontinuity between two transform cycles. In FIG. 4, 2 is a Fast Inverse Fourier Transform circuit like the Fast Inverse Fourier Transform circuit 2 in FIGS. 1, 4 is a register like the register 4 in FIG. 1, 13 is a Fast Fourier Transform circuit, 14 is a waveshape memory, 15 is a filter with a predetermined impulse response characteristic, 16 is a first RAM (will here be called a first memory means), and 17 is a second RAM (will here be called a second memory means). Numeral 11 shows a changeover switching means for writing to the RAM 116, the input of the RAM 16 being represented by the movable contact 110, and the three different input sources being represented respectively by the three fixed contacts 111, 112, and 113. Numeral 12 shows a changeover switching means for reading from the RAM 13, the output of the RAM 16 being represented by the movable contact 120, and the three different transfer destination for the read-out data being respectively represented by the three fixed contacts 121, 122, and 123. An adder is denoted by 18, a multiplier by 19, and 20 is a FIFO type memory, 21 is its input terminal for the reading clock, and 22 is a register storing the digital signal indicating zero (0).

As described in connection with FIG. 1, the signal $y_m(n)$ is the fourth waveshape signal, and the signal $Y_m(k)$ is the third spectrum signal. And in FIG. 4, the signals $X_m(n)$, $v_m(n)$, $u_m(\mathbf{1})$, $y_m(\mathbf{1})$, $U_m(n)$, $U_m(N+n)$, $U_{m-1}(N+n)$ are signals on a time domain. For the sake of the distinction in this specification, the signal $U_m(n)$ is called a first waveshape signal, the signal $U_{m-1}(N+n)$ is called a second waveshape signal, the signal $v_m(n)$ is called a third waveshape signal.

$U_m(k)$ is a signal on a frequency domain and will be called a fourth spectrum signal. The meanings of the suffix m, and the variables k, n are the same as described in connection with FIG. 1, and N is the total number of the sampling points in the waveshape signals. This means than n=0, 1, 2, . . . N−1. The meaning of the variable 1 will be explained in a later paragraph.

Figure 5:
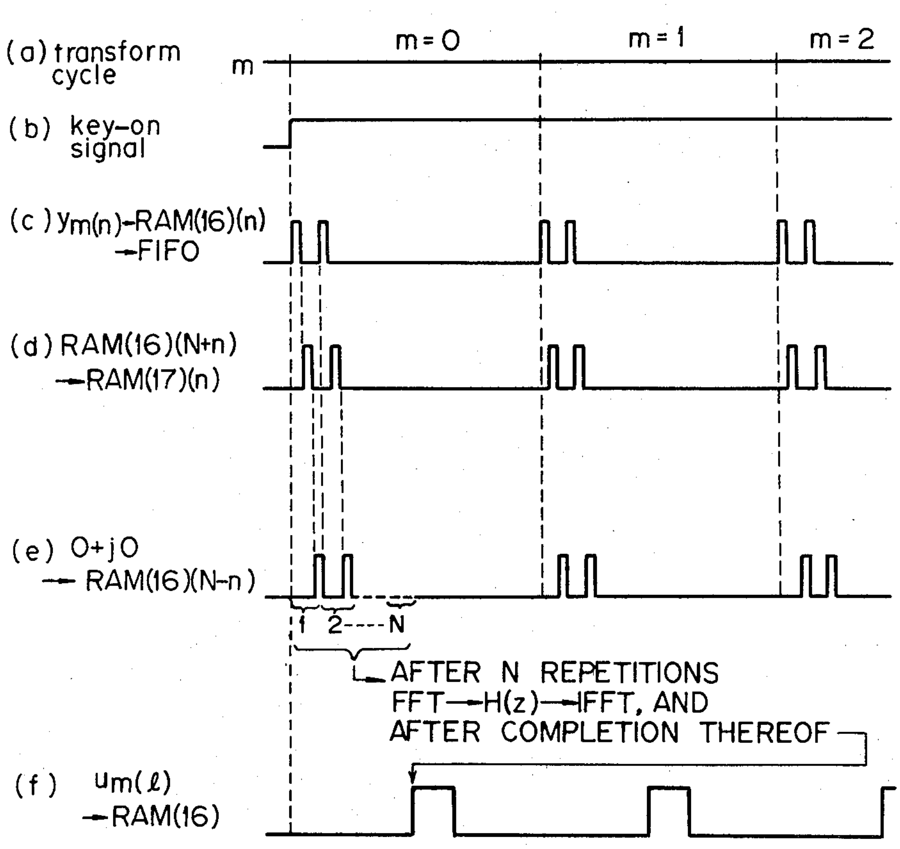
FIG. 5 is a timing diagram for the embodiment shown by FIG. 4.

Now referring also to FIG. 5, where a timing diagram for the embodiment of FIG. 4 is shown, (a) shows the sequential order m of the transform cycle, (b) shows the key-on signal, (c) shows the first load step, (d) shows the transfer step from the RAM 16 to the RAM 17, (e) shows the clearing step, and (f) shows the second load step.

Figure 6:
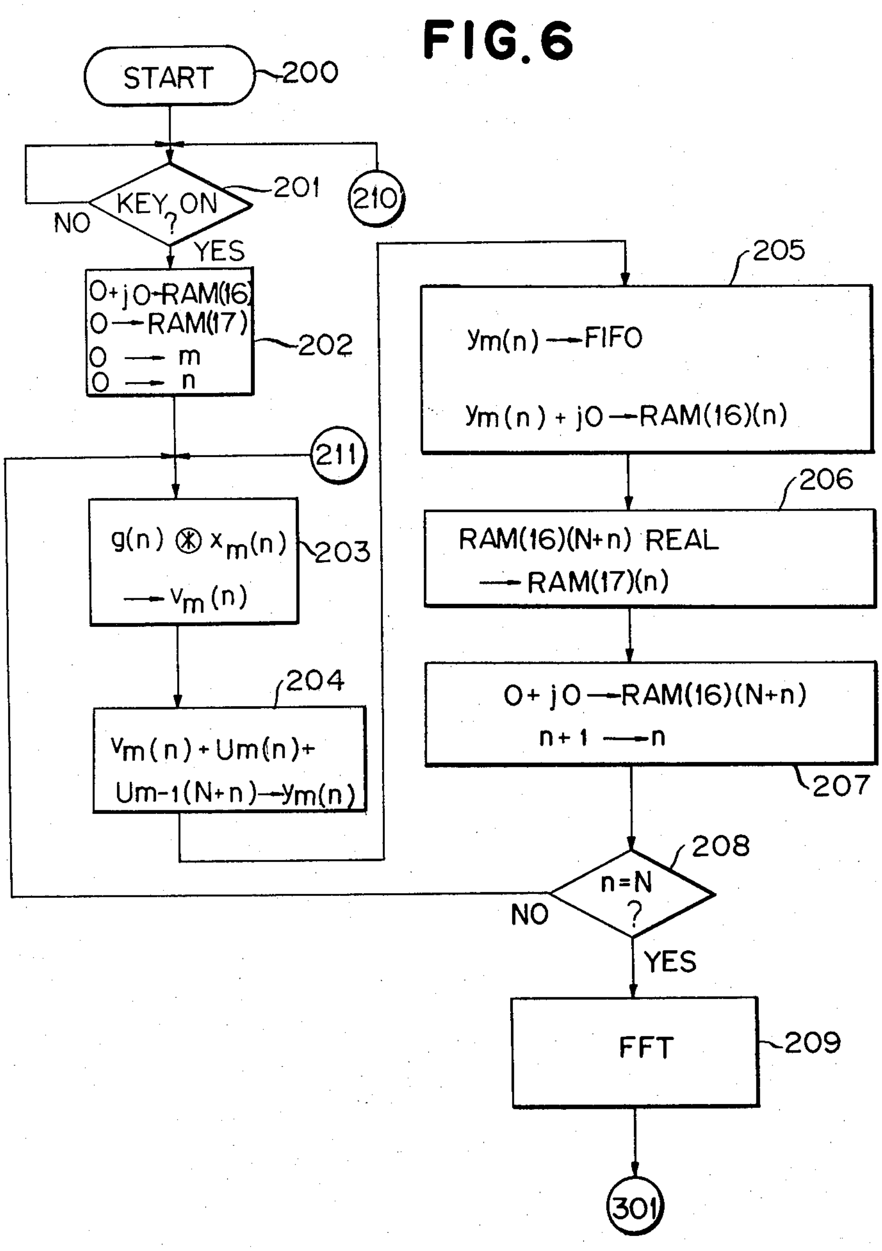
FIG. 6 is a program flow chart for the embodiment shown by FIG. 4.
Figure 7:
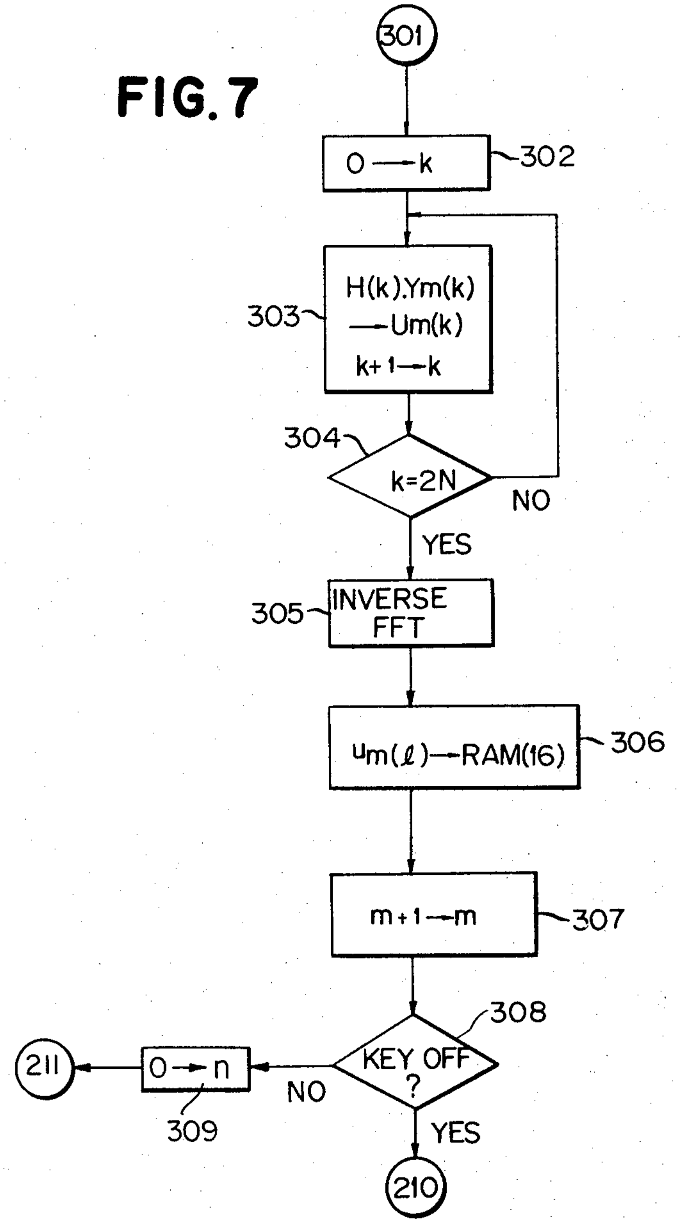
FIG. 7 is another program flow chart associated with the program flow chart of FIG. 6.

FIG. 6 and FIG. 7 together illustrate the program flow chart for the embodiment shown by FIG. 4. The performance of the system shown by FIG. 4 will be described in connection with FIG. 5, FIG. 6, and FIG. 7.

When the key-on signal which indicates that a key is pressed on a keyboard of an electronic musical instrument (associated circuits not shown in FIG. 4) is detected, the RAM 16 and the RAM 17 are cleared, and zeros (0) are set for the initial values of m and n, as shown in the program step 202 of FIG. 6. In the next step 203, the signal $x_m(n)$ is read from the waveshape memory 14; and through the filter 15, the signal $v_m(n)$ is produced as a convolution of the signal $x_m(n)$ and the response characteristic g(n) in accordance with an equation, $$v_m(n)=x_m(n)\otimes g(n) \quad (4).$$

At the program step 204, the adder 18 performs the addition in accordance with the following equation, $$y_m(n)=v_m(n)+U_m(n)+U_{m-1}(N+n) \quad (5).$$

As the RAM 16 and 17 has been cleared at the program step 202, $U_m(n)$ and $U_{m-1}(N+n)$ are both zero for the cycle m=0, and $y_m(n)=v_m(n)$ is written to the FIFO type memory 20. At this stage, the contact 110 of the switch 11 is connected to the contact 111, and $y_m(n)$ is simultaneously loaded to the RAM 16.

In the embodiment shown by FIG. 4, the relative phasing of the harmonics in a tone waveshape is taken into account. Therefore, signals on a frequency domain have phase angle information as well as amplitude information. In order to express the amplitude information and the phase angle information of a frequency signal, the signal is expressed as a vector sum of an in-phase (cosine) component and a quadrature-phase (sine) component. The amplitude of the in-phase component is expressed by a real number and the amplitude of the quadrature-phase component is expressed by an imaginary number.

Thus, the signals $Y_m(k)$, $U_m(k)$ and the transfer function H(k) in FIG. 4 are respectively composed of a real part and an imaginary part, and the Fast Inverse Fourier Transform circuit 2 uses the real part and the imaginary part of the signal $U_m(k)$ to compose the signal $u_m(1)$ on a time domain, while the Fast Fourier Transform circuit 13 transforms the signal $y_m(1)$ to the real and imaginary parts of the signal $y_m(k)$. Since the RAM 16 is used both for the Fast Fourier Transform and for the Fast Inverse Fourier Transform, the RAM 16 must be provided with the storage area for the imaginary part as well as for the real part.

Since the total number of words in the signal $y_m(n)$ is N, the RAM 16 has a memory capacity of 4N words, comprising N words for the front half of the real part, N words for the rear half of the real part, N words for the front half of the imaginary part, and N words for the rear half of the imaginary part. The meaning of the rear half of the memory area will become clear from the following descriptions.

The N words of the signal $y_m(n)$ is loaded to the front half of the real part of the RAM 16. This load step will here be called a first load step, and is shown by (c) of FIG. 5 and by the program step 205 of FIG. 6.

As shown by (d) of FIG. 5 and by the program step 206 of FIG. 6, a transfer step follows the first load step, and the data in the rear half of the real part of the RAM 16 is transferred to the RAM 17. In this transfer step, the contact 120 is connected to the contact 123. The RAM 17 has a memory capacity of N words, and stores the data transferred from the rear half of the real part of the RAM 16 until the next transfer cycle. Therefore, the output of the RAM 17 at the program step 204 is expressed by $U_{m-1}(N+n)$, in which the suffix m−1 means the data in the preceding cycle and the variable N+n means the data in the rear half.

At the transform cycle of m=0, the rear half of the real part of the RAM 16 remains cleared, and the data loaded to the RAM 17 at the cycle m=0, is zero (0), and therefore, the data read from the RAM 17 at the cycle of m=1 (at the program step 204) is zero (0).

Next comes the clearing step as shown by (e) of FIG. 5 and by the program step 207 of FIG. 6, and the rear half of the real part and the rear half of the imaginary part in the RAM 16 are cleared.

As shown by the program step 208 of FIG. 6, steps 203 to 207 are repeated for each value of n=0, 1, 2 . . . N−1, and the writing of the signal $y_m(n)$ in the FIFO type memory 20 is completed.

At each clearing step (program step 207 of FIG. 6), the contact 110 is connected to the contact 112 and zero (0) is loaded from the register 22 to the RAM 16.

After the writing of the signal $y_m(n)$ in the FIFO type memory 20 is finished, the contact 120 is connected to the contact 121, and all the words stored in the RAM 16 is transformed to the signal $Y_m(k)$ by the Fast Fourier Transform circuit 13. The contents of the RAM 16 at the start of the Fast Fourier Transform operation is denoted by the signal $y_m(1)$. It will be apparent from the foregoing descriptions, that the signal $y_m(1)$ has 2N words in the real part and other 2N words in the imaginary part, that is to say, the signal $y_m(1)$ has 2N complex words; and these complex words are represented by $y_m(1)=y_m(n)+j0$ for the range where $0\leqq 1\leqq (N-1)$, and $y_m(1)=0+j0$ for the range where $N\leqq 1\leqq (2N-1)$.

At the program steps 302, 303 and 304 of FIG. 7, the multiplier 19 performs the multiplication between the signal $Y_m(k)$ and the transfer function H(K) in a similar manner as described in connection with FIG. 1, and produces the signal $U_m(k)$ in accordance with the equation, $$U_m(k)=H(k)\cdot Y_m(k) \quad (6).$$

By the Fast Inverse Fourier Transform circuit 2, the signal $U_m(k)$ is transformed to the signal $u_m(1)$, as shown by the program step 305 of FIG. 7. The signal $u_m(1)$ is written in the RAM 16 with the contact 110 connected to the contact 113. This writing step is shown by the program step 306 of FIG. 7. As the RAM 16 is used in the progress of the Fast Inverse Fourier Transform, the writing of the signal $u_m(1)$ in the RAM 16 is completed at the same time when the Fast Inverse Fourier Transform is finished. In the program step of FIG. 7, however, the transform in the Fast Inverse Fourier Transform circuit 2 and the writing in the RAM 16 are illustrated by separate steps 305 and 306 for the convenience of the explanation. The program step 306 of FIG. 7 is performed at the phase (f) of FIG. 5, and is called a second load step. The signal $u_m(1)$ has 2N words and is loaded in the front half and the rear half of the RAM 16.

One transform cycle is completed at the end of this second load step, and the next transform cycle is commenced for an advanced value of m. (Reference is to be made to the program steps 307–309 of FIG. 7 and the program step 211 of FIG. 6 and FIG. 7.) In this next transform cycle, the program steps 203, 204, 205, 206, 207, 208, 209, 301, 302, 303, 304, 305, 306, and 307 are repeated.

The first waveshape signal $U_m(n)$ is the signal read from the front half of the real part of the RAM 16 at the program step 204 of FIG. 6, and the second wave-shape shape signal $U_{m-1}(N+n)$ is the signal read from the RAM 17 at the same program step 204. As described in the foregoing paragraph, $U_m(n)=0$ and $U_{m-1}(N+n)=0$ for m=0 and $U_{m-1}(N+n)=0$ for m=1. For the values of m≧2, the waveshape signal $y_m(n)$ is composed as the sum of the three waveshape signals $v_m(n)$, $U_m(n)$, and $U_{m-1}(N+n)$ as shown by the equation (5).

Thus, the rear half of the waveshape signal $u_m(1)$ is added to the waveshape signal $y_{m-1}(n)$ in the next transform cycle. Described in detail, the signal $u_m(1)$ at sampling points where 1=N, N+1, N+2, ... 2N−1 is added to the signal $y_{m+1}(n)$ respectively at sampling points where n=0, 1, 2, ... N−1. Therefore, the discontinuity between two successive transform cycles is eliminated.

As shown by the program step 308 of FIG. 7, transform cycles are repeated until a key-off state is detected, and the waveshape signal $y_m(n)$ is repeatedly composed and written in the FIFO type memory 20.

As described in connection with FIG. 1, the number of words of the signals $x_m(n)$, $v_m(n)$, $y_m(n)$, $U_m(n)$, $y_m(1)$, $u_m(1)$, $Y_m(k)$, and $U_m(k)$ in FIG. 4 are reduced by half when the fundamental frequency is increased by an octave. And in the system shown by FIG. 4, the timing clock frequency for the operation of the system is maintained constant irrespective to the tone frequency to be generated. The FIFO type memory 20 is used for this purpose.

The signal $y_m(n)$ is generated at a constant rate by a constant timing clock frequency and is temporarily stored in the FIFO type memory 20. Then the contents of the memory 20 is read out at a note clock frequency which is determined by the corresponding note code. The writing rate to the FIFO type memory is designed to be higher than any of the reading rates (any of the note clock frequency). The number of words stored in the FIFO type memory increases as the simultaneous writing and reading of the memory 20 are progressed, since the writing rate is always higher than the reading rate. When all the memory capacity of the memory 20 is loaded, the writing to the memory together with all the associated data-processing operations in FIG. 4 are interrupted. And during this interruption of writing, the reading is progressed continuously till the memory 20 is emptied and the writing is recommenced.

In this way, the signal $y_m(n)$ is generated and is written to the FIFO type memory 20 at a constant rate with interruptions, and the reading rate of the FIFO type memory 20 determines the frequency of the generated waveshape.

For example, the clock frequency for writing the signal $y_m(n)$ is determined to be 42,000 Hz per word which is higher than any of the reading clock frequency. When the octave code specifies 160 words and the note code specifies 20,930 Hz clock frequency per word, the reading clock of the frequency 20,930 Hz per word is applied to the input terminal 21 and the signal $y_m(n)$ is read out from the memory 20 at a repetition rate of 20,930 Hz/160=130.8 Hz; and when the octave code specifies 20 words and the note code specifies 35,200 Hz clock frequency per word, the reading clock of the frequency 35,200 Hz per word is applied to the input terminal 21 and the signal $y_m(n)$ is read out from the memory 20 at a repetition rate of 35,200 HZ/20=1,760 Hz.

In the embodiment shown by FIG. 4, the third waveshape signal $v_m(n)$ is obtained as a convolution of a waveshape signal $x_m(n)$ and an impulse response function g(n). But it is apparent that the third waveshape signal $v_m(n)$ may be generated by any other method. And it will be easily understood from FIG. 4 that the third waveshape signal may be lacking at transform cycles where m≧1, or may be substituted by any one of the other waveshape signals. Therefore, in this embodiment, a simple and inexpensive waveshape memory 14 may be used, and yet, a waveshape signal $y_m(n)$ which changes as a function of m can be obtained.

The fourth waveshape signal $y_m(n)$ is a signal on a time domain, and therefore, may be processed by any of the heretofore known waveshape signal processing methods.

As is evident from the program flow chart of FIG. 6 and FIG. 7, the process of this invention can be performed by a general purpose computer. Also it will be easy for a person skilled in the art to design and build and equipment shown by FIG. 1, FIG. 3, or FIG. 4 to perform the process of this invention.

As described in the foregoing paragraphs, important data-processings for generating tone waveshapes in this invention are performed on a frequency domain, and therefore, a filter of a desired characteristic can be composed of a simple and inexpensive circuit. By the use of such a filter (or filters), musical tones having desirable tone qualities with abundant varieties can be easily generated. It must also be noted that a digital filter on a time domain with a complicated response character requires a comparatively long operation time. This invention can reduce the operation time considerably by the data-processings on a frequency domain.

And further, a tone quality can generally be more easily imagined from the spectrum distribution than from the tone waveshape, and the data-processings on a frequency domain in this invention makes it easier to generate a desired tone quality or to simulate a tone quality of a natural musical instrument.

Also it will be apparent to those skilled in the art that various changes and modifications may be made within the spirit of the above teachings.

For example, a Fast Fourier Transform and a Fast Inverse Fourier Transform algorithms are used in all the embodiments illustrated. But the Hadamard Transform may as well be used to transform a signal on a time domain to a Walsh function and the signal is processed in the form of the Walsh function; or the Fermat Transform may as well be used to transform a signal on a time domain to a Fermat Number and the signal is processed in the form of the Fermat Number. It may sometimes be more convenient to use the Fermat Number because the Fermat Number can be treated by the theory of numbers.

I claim:

1. A process for forming musical tones comprising:

a step of repeatedly generating a first spectrum signal expressing a first frequency spectrum distribution;

a step of repeatedly generating a third spectrum signal by adding a second spectrum signal to said first spectrum signal;

a step of repeatedly generating said second spectrum signal by delaying said third spectrum signal for one repeat cycle and multiplying by a first transfer function on a frequency domain;

a step of repeatedly generating a fourth waveshape signal from said third spectrum signal by the Inverse Fourier Transform operation; and a step of generating a waveshape and tone having a designated frequency in accordance with said fourth waveshape signal.

2. A process for forming musical tones in accordance with claim 1, wherein said step of repeatedly generating said first spectrum signal comprises:

a step of repeatedly reading a memory which stores data corresponding to said first spectrum distribution.

3. A process for forming musical tones in accordance with claim 1, wherein said step of repeatedly generating said first spectrum signal comprises:

a step of repeatedly analysing frequency components included in a cycle of a waveshape signal on a time domain.

4. A process for forming musical tones in accordance with claim 1, wherein said step of generating a waveshape having a designated frequency comprises:

a step of generating an octave code and a note code, said octave code indicating the octave in which said designated frequency belongs and said note code specifying the note of said designated frequency;

a step of determining the number of words composing said first, second and third spectrum signals and said fourth waveshape signal in accordance with said octave code in such a way as said number of words is decreased by half when said designated frequency is increased by an octave; and a step of selecting a timing clock frequency out of twelve predetermined frequencies in accordance with said note code, said timing clock being used as the data-processing timing clock per word in said step of repeatedly generating a fourth waveshape signal by the Inverse Fourier Transform operation.

5. A process for forming musical tones in accordance with claim 1, wherein said step of generating a waveshape having a designated frequency comprises:

a step of generating an octave code and a note code, said octave code indicating the octave in which said designated frequency belongs and said note code specifying the note of said designated frequency;

a step of determining the number of words composing said first, second and third spectrum signals and said fourth waveshape signal in accordance with said octave code in such a way as said number of words is decreased by half when said designated frequency is increased by an octave;

a step of repeatedly writing said fourth waveshape signal to a FIFO type memory by a fixed timing clock frequency; and a step of selecting a reading clock frequency out of twelve predetermined frequencies in accordance with said note code, said reading clock being used as the reading clock per word of said FIFO type memory.

6. A process for forming musical tones comprising:

a first load step in which a first waveshape signal, a second waveshape signal, and a third waveshape signal are added to generate a fourth waveshape signal which is loaded to the first half of a first memory means, said first waveshape signal being read out from said first half of said first memory means prior to loading therein of said fourth waveshape signal, said second waveshape signal being the signal read out from a second memory means, said third waveshape signal being an input waveshape signal to be formed into a musical tone a transfer step in which data stored in the second half of said first memory means is transferred to said second memory means after said first load step;

a clearing step in which said second half of said first memory means is loaded by zero after said transfer step;

a step of generating a third spectrum signal by transforming the contents of said first memory means after said clearing step to a frequency spectrum by the Fourier Transform operation;

a step of generating a fourth spectrum signal by multiplying said third spectrum signal by a first transfer function on a frequency domain;

a second load step in which said fourth spectrum signal is transformed to a function of time by the Inverse the first and second halves of Fourier Transform operation, the result being stored said first memory means in place of the prior contents thereof;

a step of repeatedly generating said fourth waveshape signal by repeating said first load step, said transfer step, said clearing step, and said second load step in a cyclic order; and a step of generating a waveshape and tone having a designated frequency in accordance with said fourth waveshape signal.

7. A process for forming musical tones in accordance with claim 6, wherein said third waveshape signal is generated by a convolution between a waveshape signal read out from a waveshape memory and an impulse response signal which represents a predetermined impulse response character on a time domain.

8. A process for forming musical tones in accordance with claim 6, wherein said step of generating a waveshape having a designated frequency comprises:

a step of generating an octave code and a note code, said octave code indicating the octave in which said designated frequency belongs and said note code specifying the note of said designated frequency;

a step of determining the number of words composing said first, second, third and fourth waveshape signals and said third and fourth spectrum signals in accordance with said octave code in such a way that said number of words is decreased by half when said designated frequency is increased by an octave; and a step of selecting a timing clock frequency out of twelve predetermined frequencies in accordance with said note code, said timing clock being used as the data-processing timing clock per word in said step of repeatedly generating said fourth waveshape signal.

9. A process for forming musical tones in accordance with claim 6, wherein said step of generating a waveshape having a designated frequency comprises:

a step of generating an octave code and a note code, said octave code indicating the octave in which said designated frequency belongs and said note code specifying the note of said designated frequency;

a step of determining the number of words composing said first, second, third and fourth waveshape signals and said third and fourth spectrum signals in accordance with said octave code, in such way that said number of words is decreased by half when said designated frequency is increased by an octave;

a step of repeatedly writing said fourth waveshape signal to a FIFO type memory by a fixed timing clock frequency; and a step of selecting a reading clock frequency out of twelve predetermined frequencies in accordance with said note code, said reading clock being used as the reading clock per word of said FIFO type memory.

10. Apparatus for forming musical tones, comprising:

means for repetitively providing during successive time intervals $T_o$ an amplitude sampled time domain source waveshape signal $V_m(n)$, first memory means for storing amplitude samples of a time domain first waveshape signal $y_m(l)$, transform means, operative once each time interval $T_o$, for transforming said stored first waveshape signal to the corresponding frequency domain spectrum signal $y_m(k)$, for modifying said corresponding spectrum signal by a frequency domain transfer function H(k), and for inversely transforming the modified corresponding spectrum signal $U_m(k)$ back to the time domain to produce an amplitude sampled time domain second waveshape signal $U_m(l)$, delay means for storing a certain portion $U_m(N+n)$ of said second waveshape signal until a later time interval $T_o$, combining means, operative during each time interval $T_o$, for combining the source waveshape signal $V_m(n)$ provided during the current time interval, a different portion $U_m(n)$ of said second waveshape signal, and the stored certain portion $U_{m-l}(N+n)$ of said second waveshape signal from a prior time interval $T_o$ to produce an amplitude sampled time domain output waveshape signal $Y_m(n)$, said output waveshape signal also being stored in said first memory means as part of said first waveshape signal $Y_m(l)$, and means for producing musical tones from said output waveshape signal.

11. Apparatus according to claim 10 wherein:

during each time interval $T_o$ said source waveshape signal $V_m(n)$ and said output waveshape signal $Y_m(n)$ each for represented by N amplitude sample points, wherein:

said first memory means stores 2N amplitude samples of said first waveshape signal $Y_m(l)$, the first N stored amplitude samples being the corresponding N amplitude samples of the output waveshape signal $Y_m(n)$, the second N amplitude samples being zero, and wherein:

said second waveshape signal $U_m(l)$ produced by said transform means has 2N sample points, said different portion of said second waveshape signal being the first N amplitude samples of said produced second waveshape signal $U_m(l)$, said certain portion being the second N amplitude samples of said produced second waveshape signal.

12. Apparatus according to claim 11 wherein during each time interval $T_o$ said combining means combines said source waveshape signal with said different portion of the second waveshape signal produced during the immediately preceding time interval, and with said stored certain portion of the second waveshape signal produced two time intervals earlier.

13. Apparatus according to claim 10 wherein said modifying comprises multiplication, and wherein said combining comprises algebraic addition.

14. Apparatus for forming musical tones, comprising:

means for storing, at each of successive time intervals, a time domain first waveshape signal having a set of 2N amplitude samples, the amplitude samples of the second half of said first waveshape signal all being zero, frequency domain modification means, operative each time interval, for transforming said first waveshape signal to the frequency domain, modifying the resultant frequency domain signal, and inversely transforming the modified frequency domain signal to form a time domain second waveshape signal having a set of 2N amplitude samples, at least some of the amplitude samples in the second half of said second waveshape signal being non-zero, means for generating a time domain resultant waveshape signal having N amplitude samples by utilizing the sampled amplitudes of the first half of the second waveshape signal formed during one time interval combined with the amplitude samples of the second half of the second waveshape signal formed during a prior time interval, the amplitude samples of said resultant waveshape signal also being supplied to said storing means for use as the amplitude samples of the first half of said first waveshape signal, and means for converting said resultant waveshape signal to a musical tone.

15. Apparatus according to claim 14 further comprising:

source means for providing at each successive time interval a time domain source waveshape signal having N amplitude samples, said means for generating being operative during each time interval to combine the amplitude samples of said source waveshape signal provided during that time interval with the sampled amplitudes of the first half of the second waveshape signal formed during the preceding time interval, and with the amplitude samples of the second half of the second waveshape signal formed two time intervals earlier.

16. Apparatus according to claim 14 further comprising:

timing means for establishing said time intervals in accordance with a selected musical note, said converting being carried out as said resultant waveshape signal is generated, whereby said formed musical tones have a fundamental frequency corresponding to said selected musical note.

17. Apparatus according to claim 14 wherein said means for converting comprises:

a first in-first out memory connected to receive said resultant waveshape signal from said means for generating, and memory readout control means for reading out said resultant waveshape signal from said first in-first out memory at a rate corresponding to the frequency of a selected musical note.

* * * * *